United States Patent [19]
Suvada

[11] 3,844,049
[45] Oct. 29, 1974

[54] DRAWING AID SYSTEM
[76] Inventor: Paul Suvada, 2820 E. 122nd St., Cleveland, Ohio 44120
[22] Filed: Jan. 8, 1973
[21] Appl. No.: 321,559

[52] U.S. Cl. ................................. 33/262, 35/26
[51] Int. Cl. ............................................. B43l 13/00
[58] Field of Search ................. 33/262, 277; 35/26; 24/3 B

[56] References Cited
UNITED STATES PATENTS

| | | | |
|---|---|---|---|
| 1,277,191 | 8/1918 | Butler | 33/262 |
| 1,363,670 | 12/1920 | Parker | 33/262 |
| 1,645,752 | 10/1927 | Hansen | 33/277 |
| 1,821,252 | 9/1931 | Woods | 35/26 UX |
| 1,992,083 | 2/1935 | McDonald | 35/26 |
| 2,164,463 | 7/1939 | Mather | 33/262 |
| 2,796,666 | 6/1957 | Liebowitz | 33/262 |
| 3,660,903 | 5/1972 | Caperton | 35/26 X |

FOREIGN PATENTS OR APPLICATIONS

| 276,679 | 7/1914 | Germany | 33/277 |
|---|---|---|---|

*Primary Examiner*—Harland S. Skogquist
*Attorney, Agent, or Firm*—Teare, Teare & Sammon

[57] ABSTRACT

The drawing aid system disclosed comprises a frame means with a reference grid disposed within it and a primary positioning means which adjustably fixes the distance from the frame and its associated grid to the artist's eye. A secondary positioning means may be provided for fixing the position of the frame means and its associated grid with respect to the subject being graphically represented by the artist.

2 Claims, 5 Drawing Figures

PATENTED OCT 29 1974  3,844,049

DRAWING AID SYSTEM

BACKGROUND OF THE INVENTION

The device of the present invention relates to a drawing aid system. More particularly, it relates to a drawing aid system which facilitates accurate composition and proportioning of three dimensional subjects from life by the artist.

Heretofore, various arrangements have been utilized to aid the artist either in composing the artist's subject for drawing from life or in proportioning two dimensional subjects for drawing. Prior arrangements were not altogether satisfactory since, after interrupting his work to rest, the artist had difficulty in accurately resetting the drawing aid to its former position to continue his drawing.

SUMMARY OF THE INVENTION

In general, the drawing aid system of the present invention preferably comprises a frame means with a reference grid disposed within it and a primary positioning means which adjustably fixes the distance from the frame and its associated grid to the artist's eye. A secondary positioning means may be provided for fixing the position of the frame means and its associated grid with respect to the subject being graphically represented by the artist.

It is an object of the present invention to both aid in composing a three dimensional subject and in proportioning it for graphic representation.

It is a further object of the present invention to fix the position of a drawing aid with respect to both the artist's eye and his subject so that the drawing aid can be returned to this position if it is shifted away from it for any reason.

These and other objects are described in the disclosed description of the present invention.

DESCRIPTION OF THE PREFERRED EMBODIMENTS

Figure 1:
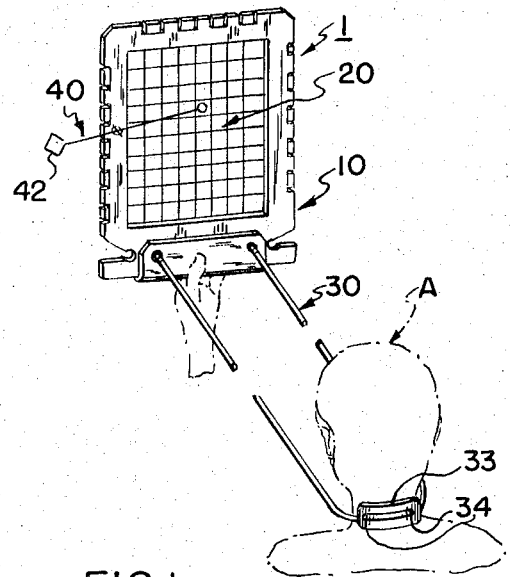
FIG. 1 is a perspective view illustrating the drawing aid device 1 being operated by an artist user A.

The drawing aid device 1 of the present invention, in the form shown in FIG. 1, preferably comprises a frame member 10 for composing the subject to be drawn by the artist A, a reference grid 20 for proportioning the features of the subject and an adjustable positioning lanyard 30 which accurately spaces the grid 20 and frame member 10 from the artist's eye. The device 1 may also preferably include a position locator 40 which references the position of the grid 20 and frame member 10 with respect to the subject. This construction permits the artist to compose his subject by moving the position of the frame member 10 and grid 20 until the desired composition is found. This position is then fixed by adjusting the lanyard 30 to fix the distance between the artist's eye and the frame member 10 and grid 20 and then by moving the locator 40 until it is aligned with the point on the grid 20 where the image of a prominent feature of the subject falls and fixing the locator at that point.

Figures 2, 3:
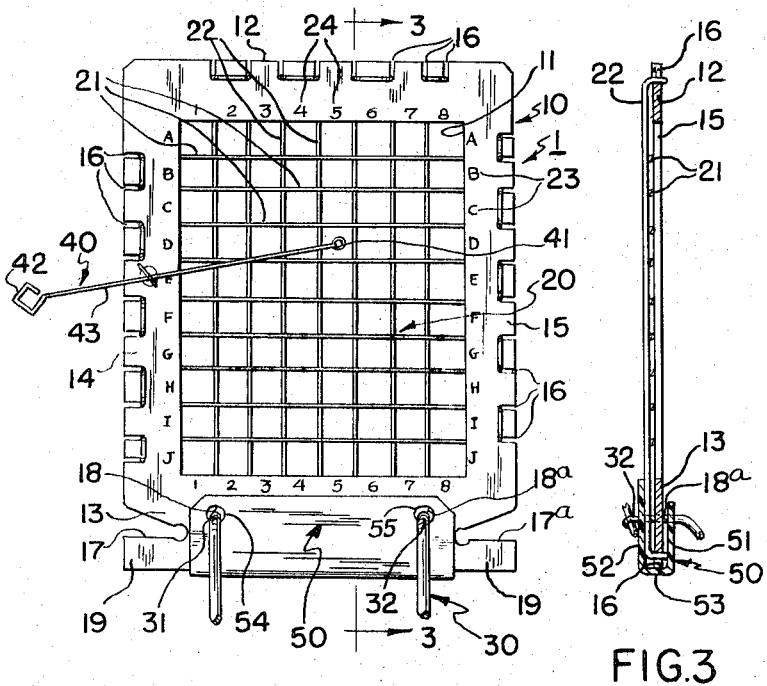
FIG. 2 is a fragmentary front elevation view of a portion of the device 1 of FIG. 1.
FIG. 3 is a fragmentary side elevation view, in a section taken along the line 3—3 of FIG. 2, of the device 1 of FIG. 1.

The frame member 10 is preferably provided with a central aperture 11, as may best be seen in FIG. 2, through which the artist A (FIG. 1) may view his subject. This central aperture 11 preferably has a rectangular configuration (the term, "rectangular," including both a square and a rectangle with one pair of opposed sides longer than the other pair). This aperture 11, in the form shown, is defined by parallel upper and lower horizontal bar portions 12 and 13, respectively, and parallel right and left vertical bar portions 15 and 14, respectively, which intersect the horizontal bar portions at right angles to provide the desired rectangular shape. Each of the bar portions 12, 13, 14 and 15, is provided with a plurality of slots 16 to receive and mount the reference grid 20. The lower horizontal bar portion 13 is enlarged in its widthwise dimension to provide mounting and storage for the lanyard 30 and gripping capacity for the artist's hand (FIG. 1). A pair of opposed recesses 17 and 17a extend inwardly from each marginal side edge and are spaced a short distance from the bottom edge to permit the lanyard 30 to be conveniently wound around the lower horizontal bar portion 13 and stored without increasing the width of the device 1. In addition, a pair of spaced holes 18 and 18a perforate the lower bar portion 13 so that the respective ends 31 and 32, respectively, of lanyard 30 can pass through them and be held in place by a knot (FIG. 3). By this construction, one end, such as 31, can be pulled to adjustably shorten the lanyard 30 and then be wound around an arm 19 formed by the segment of the lower horizontal bar portion 13 between a recess, such as 17, and the bottom edge of the bar portion 13. This fixes the length of the lanyard 30 and the distance from the artist's eye to the frame member 10, thereby serving to partially fix the orientation of the device 1. The longitudinal space between the holes 18 and 18a provides a gripping area for the artist's fingers as he holds the device 1. In the device 1, shown in FIGS. 2 and 3, a finger grip 50 may be provided for protecting the grid member 20 as it passes over the rear surface of the bar portion 13 from the slots 16 (FIG. 3) to the central aperture 11. This finger grip 50 has a generally J-shaped configuration in side elevation (FIG. 3) with a reduced height, planar front leg 51 being joined to a planar rear leg 52 by a planar interconnecting bight 53. The width of the grip 50 (FIG. 2) is greater than the distance between the holes 18 and 18a so that the grip may be perforated by a pair of holes 54 and 55 which register with holes 18 and 18a, respectively. In the form shown, the frame member 10 is formed as an integral unit from a rigid material. The grip 50 is preferably formed of an abrasion resistant material, such as a polymeric material.

The reference grid 20, in the form shown, comprises a first set of at least one horizontal line means 21 and a second set of at least one vertical line means 22 which intersects the horizontal line means at right angles. Each set, in turn, preferably comprises a plurality of parallel, equally-spaced line means. Since the grid 21 is disposed within the central aperture 11, it subdivides the aperture 11 into a plurality of rectangular areas which aid in proportioning the subject being drawn. In other words, the horizontal line means 21 (including the aperture edges) define therebetween a plurality of horizontal row-spaces, the vertical line means 22 (including the aperture edges) define therebetween a plurality of vertical column-spaces, and the combined line means 21 and 22 define a plurality of rectangle-spaces. In the form shown, the distance between adjacent horizontal line means is equal to the distance between adjacent vertical line means so that these areas are squares. The important feature, however, is that the distances between adjacent horizontal line means are equal and that the distances between adjacent vertical line means are equal. Associated with the row-spaces is a first set of reference indicia 23, such as Roman letters. A second set of reference indicia 24, such as Arabic numerals, is associated with the column-spaces. Consequently, a given rectanglespace can be referenced and located by specifying an indicia drawn from the first set 23 and an indicia drawn from the second set 24. Alternatively, the indicia can be associated directly with the line means, 21 or 22, themselves. In this way, a given intersection of a horizontal line means 21 with a vertical line means 22 can be identified by a specific pair of indicia and this pair of indicia can, therefore, be used to reference and locate a point rather than a space. While, in the form shown in FIG. 2, there are seven vertical line means 22 (with an associated eight vertical column-spaces and eight indicia 24) and nine horizontal line means 22 (with an associated ten horizontal row spaces and ten indicia 23), a larger or smaller number of line means may be used according to the degree of subdivision desired in referencing and proportioning the composed subject matter. The line means 21 and 22 are preferably of cylindrical strands, such as string, with the aperture 11 being otherwise open to eliminate glare, fingerprints or scratches which might occasion the use of a transparent sheet. Preferably, a single strand is laced through the slots 16 (FIGS. 2 and 3) to provide the line means 21 and 22 and, consequently, the grid 20. The use of a single strand facilitates and simplifies replacement of the grid 20 when necessary. Preferably, the strand is a dark color, such as red, to provide sufficient contrast with the artist's subject in order to be clearly seen.

Figure 4:
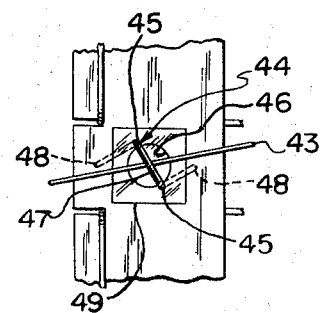
FIG. 4 is a fragmentary front elevation of a portion of the device 1 of FIG. 1.

The position locator 40 (FIG. 2) preferably comprises a sighting portion 41, a finger grip portion 42 and an interconnecting, stem portion 43. The locator 40 is used to locate the position of a prominent feature of the artist's life subject with reference to the grid 20. Sighting portion 41 acts as a sight which is movably aligned with the prominent feature and the artist's eye. To facilitate this sighting, the sight portion 41 has the configuration of a closed figure with a central opening, preferably that of a circle. The finger grip portion 42 acts as a handle for the artist's fingers to engage and grip as he aligns sight portion 41. Preferably, it has a rhomboid configuration with the stem portion 43 extending diagonally outwardly from one of its corners. The stem portion 43 extends linearly from the grip portion 42 to the sight portion 41 where it terminates as a normal to the circular sight. Preferably, the locator 40 is formed of a cylindrical strand material, such as a corrosion-resistant steel wire. In addition to interconnecting the portions 41 and 42, the stem portion 43 joins the locator 40 to the frame 10 via a fastening clip 44 (FIG. 4).

The fastening clip 44 pivotally mounts the locator 40. It preferably comprises a pair of spaced, parallel legs 45 (which pass vertically through a circular aperture 46 in the frame side portion 14) and an interconnecting bight 47 through which the stem portion 43 extends. Each leg 45 is provided with a terminal foot 48 which engages the underside of frame 10. These feet 48 diverge perpendicularly outwardly from the legs 45 in opposite but parallel directions from each other to prevent the clip 44 from falling out of the aperture 46. The legs 45 extend above the frame 10 a sufficient distance so that the stem portion 43, entrapped under bight 47, frictionally engages the frame 10 and is slidably movable for aligning or sighting. Stem portion 43 also prevents the clip 44 from falling backwardly out of the aperture 46. The length of the bight 47 is sufficient to permit limited pivotal movement over the major portion of the central aperture 11 and grid 20. To facilitate sliding and pivotal movement of the locator, a lubricating washer 49 can be placed between the locator 40 and bight 47, with the legs 45 passing through it. Preferably the clip 44 is made of a resilient cylindrical strand material, such as corrosion-resistant steel wire, and the washer 49 of a smooth material, such as polymeric sheet material.

The lanyard 30 extends from one hole 18 in the lower horizontal bar portion 13, around the artist's neck, and through the remaining hole 18a (FIGS. 1 and 2). Each end, 31 and 32, is held in place against movement in one direction by a knot (FIG. 3). Movement in the other direction to shorten the lanyard 30 is permitted. Preferably, the lanyard is formed of a soft, flexible material, such as twine, to permit comfortable seating of the lanyard 30 over the artist's neck. Optionally, to prevent the lanyard 30 from digging into the artist's neck, thereby varying the distance from the artist's eye to frame 10 and creating discomfort, the lanyard 30 may be provided with a neck band 33. The band 33 may comprise a planar rectangle with a pair of spaced apertures 34 in it through which the lanyard 30 passes. The corners of the rectangle may be rounded off. It may be composed of a flexible sheet material, such as leather or cardboard.

Figure 5:
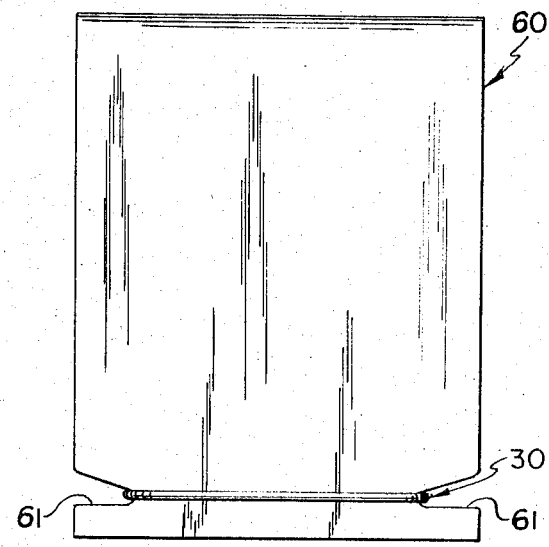
FIG. 5 is a front elevation of a holder 60 for the device 1 of FIG. 1

To facilitate storage of the device 1, a holder 60 (FIG. 5) may be provided. Preferably, it has the same general peripheral outline as the frame 10, i.e., generally rectangular with a pair of oppositely disposed, V-shaped notches 61 spaced slightly upwardly from its lower edge. In side elevation, the holder 60 has an inverted, extended U-shaped configuration with front and rear covers of increased length and a reduced length interconnecting top (not shown). In use, the frame 10 with its associated grip 50 and with the neck band 33 drawn up against grip 50 (and with one end of the lanyard 30 hanging free) is slipped between the front and rear covers of the holder 50. The free end of the lanyard 30 is then wound around the lower end of the holder 50 using the notches 61.

It is preferred that a second reference grid (not shown) corresponding in number and interrelationship of line means and in proportion of column-, row- and rectangle-spaces, be provided in association with the medium on which the artist is going to graphically represent his subject. This second reference grid may comprise horizontal and vertical line means scribed directly on the medium he is using, such as drawing paper, or printing panel, or the like. Preferably, the horizontal and vertical line means may be scribed on a separate planar sheet of light color, such as white, using a dark color, such as black, for the line means. This scribed sheet is then placed beneath the artist's non-opaque medium, such as tracing paper, so that the grid will show through during drawing yet not appear permanently on the medium.

While the frame 10 has been illustrated as being provided with a grip 50, the grip 50 may be deleted. Alternatively, the grip 50 may be modified to provide a depending vertical handle (not shown) which the artist can clasp with his whole hand. In turn, his handle can be made telescoping and extending so that it reaches and terminally engages the ground so that the handle supports the frame 10 at eye level without the need for the artist's hand to hold it up there.

In using the device 1 for graphically representing his subject from life, such as by pencil sketching, the artist A places the loop of the lanyard 30 around the back of his neck (FIG. 1) with the two ends 31 and 32 secured through holes 18 and 18a. The neck band 33 rides against the back of the artist's neck. The artist A then grasps the frame member 10 in one hand (the hand he would not use in sketching) with his fingers engaging the finger grip 50 and its associated lower horizontal bar portion 13. Viewing his subject through a single eye, preferably corresponding to the hand in which he holds the frame member 10, he moves the frame member 10, (which is vertically oriented), sidewise, up-and-down, forward-and-back and rotationally until he secures the desired orientation of the frame member 10 and desired frame member-to-eye distance to give him the composition of the subject he desires. With the frame member 10 held in this position, he draws one end, such as 32, of the lanyard 30 tight through its associated hole, such as 18a, and winds this free end (32) around the associated arm (19) of the frame member 10 to hold the free end in place and to fix the distance between his eye and the frame member 10. Still holding the frame member 10 in its position, he selects a point on a prominent feature of his life subject and, with his other hand, moves the finger grip portion 42 of locator 40 so that the sighting portion 41 is aligned with this point and the artist's eye. Thus, the sighting portion 41 is located at the point of intersection of the visual image of the point with the plane of the grid 20. If desired, the artist A can remove the frame member 10 from its position and later reliably return it to its original position. The artist can also reliably glance from his subject to his sketch pad and back without fear of misaligning the frame member 10.

Preferably, in graphically representing his subject, such as by pencil sketching, the artist A looks through the transparent reference grid 20 at his subject with his opened eye and notes the point at which a chosen line in the subject crosses a line means 21 or 22 of the reference grid 20. He then marks this point on his medium, such as sketching paper, using the corresponding point on the corresponding line means of the second reference grid associated with the medium. Proceeding along his chosen line, the artist A notes and marks the next point of intersection of the chosen line with a line means. Having located and marked two points on his medium, the artist A may now wish to connect them using a line corresponding in shape to the visual image he sees through grid 20. By proceeding in this manner the artist A can complete his graphic representation in stepwise fashion and graphically represent his subject more easily and correctly than by a free eye or freehand technique. In addition, he can interrupt his work and return to it later without harming his artistic effort. While the aforesaid method of locating and marking the features of an artist's subject is preferred for a beginning artist, the method can be modified according to the skill of the artist.

By the foregoing arrangement of elements, the device 1 provides a drawing aid which can be accurately and quickly returned to its original position after having been moved out of position. The device 1 aids in both composing and graphically representing the artist's subject from life. In addition, since the reference grid 20 is open space except for the line means 21 and 22, the subject can be viewed without impairments, such as scratches, smudges or off-color sheet material.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

I claim:

1. A drawing aid system including a frame means having a front face, a rear face and transparent central portion, and a reference grid disposed within said portion, through which a subject to be sketched may be viewed relative to said grid, said grid comprising, a plurality of horizontal line means, and a plurality of vertical line means intersecting said horizontal line means to establish a plurality of fixed reference points within said transparent portion as to which points on the subject may be visually correlated, a primary positioning means comprising a first aperture in said frame means and a second aperture laterally spaced from said first aperture, a first recess which extends inwardly from one marginal edge of said frame means adjacent said first aperture and a second recess which extends inwardly from a marginal edge of said frame means adjacent said second aperture, and a flexible lanyard slidably mounted in said apertures with the ends of said lanyard projecting beyond the rear face of said frame means, each of said lanyard ends having securement means to prevent the ends of the lanyard from sliding through said apertures so that an intermediate portion of said lanyard forms a closed loop projecting from the front face of said frame means, said lanyard being of sufficient length to pass around the neck of the user when the frame means is manually held at a predetermined distance from the user, a sufficient portion of the lanyard projecting beyond the rear face of said frame means so as to be windable within said recess and about the marginal edge of the frame means to secure said lanyard to the frame means when the position of the frame means relative to the neck of the user has been determined, and a secondary positioning means comprising a movable sight means adjustably mounted on said frame means so that said sight means may be moved to selective portions of said grid for visually fixing said grid relative to a prominent reference point on the subject being graphically represented by the artist, whereby the artist can readily relocate the frame to its initial position in the event that the artist should move the frame during use thereof.

2. A system according to claim 1 wherein
holder means having front and rear covers and adapted to receive the frame means therebetween to provide storage therefor, said holder means having notches disposed in general alignment with the recesses of the frame means when the frame means is placed in the holder means whereby said holder means is securable relative to the frame means by wrapping the said lanyard about said notches to detachably secure the holder means to the frame means.

* * * * *